Feb. 25, 1964   KIYOSHI INOUE   3,122,628
ELECTRICAL DISCHARGE GRINDING APPARATUS WITH
AUTOMATIC ELECTRODE RESHAPING PROVISION
Filed Jan. 31, 1963   2 Sheets-Sheet 1
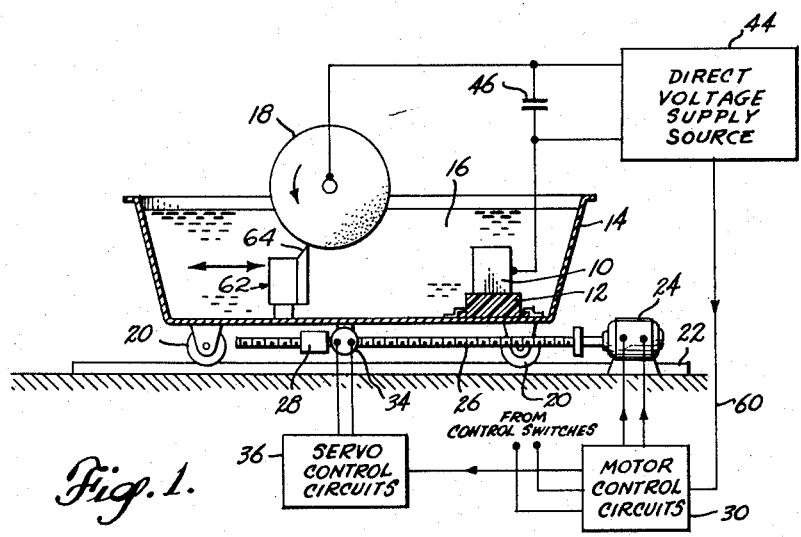
Fig. 1.
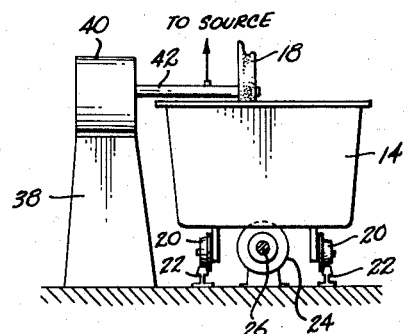
Fig. 2.
Fig. 3.
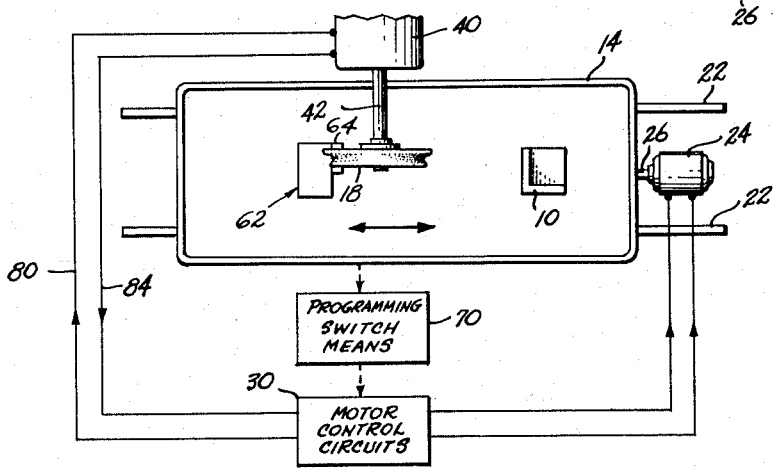
INVENTOR.
KIYOSHI INOUE
BY
Reynolds, Beach & Christensen
ATTORNEYS

United States Patent Office 3,122,628
Patented Feb. 25, 1964

3,122,628
ELECTRICAL DISCHARGE GRINDING APPARATUS WITH AUTOMATIC ELECTRODE RESHAPING PROVISION
Kiyoshi Inoue, 182 3-chome, Tamagawagoga-machi, Setagaya-ku, Tokyo, Japan
Filed Jan. 31, 1963, Ser. No. 255,412
5 Claims. (Cl. 219—69)

This invention relates to further improvements in apparatus and techniques for machining or grinding metal parts by an electrical discharge occurring between an electrode and a work piece in a suitable machining fluid, the type of such machining herein illustrated being referred to as spark discharge machining. A broad object of the invention is to provide an efficient production apparatus which is capable of precision grinding and more particularly of maintaining the precise shape required for the grinding electrode despite unavoidable erosion of the electrode along with erosion of the work piece during the grinding operation. The invention is herein illustratively described by reference to the presently preferred embodiment thereof; however, it will be recognized that certain modifications and changes therein with respect to details may be made without departing from the essential features involved.

Tool decrement or erosion is perhaps one of the most serious problems in spark discharge machining. Whereas in conventional mechanical or abrasion type machining wherein the work is cut, ground or otherwise shaped by a mechanical cutting tool electrode, decrement ranges between approximately two percent and ten percent of the weight of metal removed from the work piece, in electric spark discharge machining the decrement ranges from approximately ten percent to two hundred percent, depending upon the operating conditions and the materials involved. Consequently, in order to grind or otherwise machine parts precisely to a required shape or set of dimensions (i.e., the term grinding as herein used includes spark discharge machining by a combined abrasion and spark discharge operation, as well as other applicable spark discharge machining processes), it is either necessary to replace electrodes frequently because of electrode erosion or to provide a suitable means for reforming or reshaping the machining electrode in conjunction with the spark discharge process itself. The cost of frequently replacing electrodes as they wear, and the delays involved therein, make such a technique unacceptable. The present invention, therefore, is directed toward provision of practical apparatus which accomplishes the necessary electrode reshaping essentially during and in conjunction with the grinding operation itself, in a manner which is economical and efficient, and which is generally more accurate than a procedure involving electrode replacement because with this technique no repositioning of electrodes in a holder is required.

A specific object herein is to provide apparatus incorporating means for automatically and intermittently reshaping the grinding electrode by means of a dressing or shaping tool situated in predetermined relationship to the work piece and to which the grinding electrode is presented at regular intervals so as to prevent use thereof in a misshapen condition. In this regard it is an object to provide a relatively simple and light weight mechanism which accomplishes the alternate grinding and electrode redressing operations in a rapid and efficient manner permitting utilization for this purpose of the same feed mechanism as that which effects relative feed motion between the work piece and electrode, and of so doing without complicating nor impairing the sensitivity and capability of that feed mechanism to maintain the necessary microscopic gap between the electrode and work piece during the grinding function.

A specific object of the invention is a grinder electrode redressing tool arrangement wherein friction is minimized so as to minimize the reaction forces on the tool, and thereby permit use of relatively light weight supporting mechanism which will not impair the response time of the feed mechanism and the load which it moves.

A further and related object, directed to additional features of the invention, relates to a novel means for vibrating a cutting tool at high frequency, and more especially in providing a high-frequency oscillator which is efficient and capable of delivering high output power as compared with conventional vacuum tube type oscillator power sources.

These and other objects and advantages, together with the novel features of the present invention, will become more fully evident from the following description thereof by reference to the accompanying drawings.

FIGURE 1 is a simplified and partially schematic side view of the improved grinding apparatus in its presently preferred form, the grinding fluid container being shown in longitudinal section.

FIGURE 2 is an end view of the apparatus as seen from the left end with relation to FIGURE 1.

FIGURE 3 is a top view of the apparatus.

Figure 4:
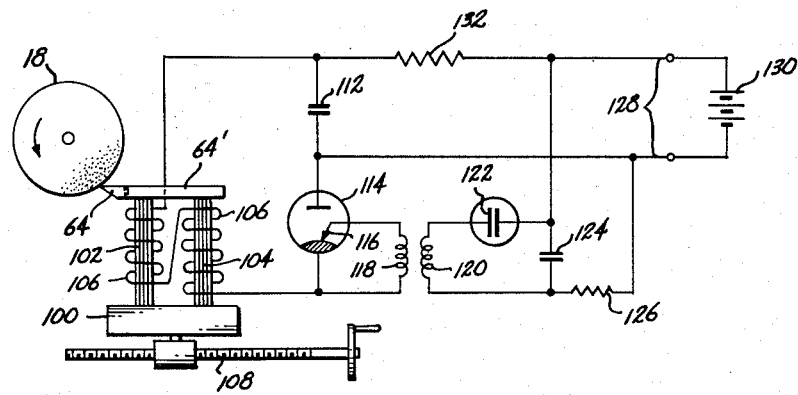
FIGURE 4 is a simplified and partially schematic diagram of the novel cutting tool vibrating system.

In the example shown in FIGURE 1 et seq., for example, let it be assumed that the work piece 10 comprises the basic stock out of which a precision turbine blade is to be ground. The work piece is mounted on a stationary insulating support 12 by which it is secured firmly in the tank 14 which contains suitable spark discharge machining fluid 16, such as oil or kerosene. This same reservoir of machining fluid is also effective as a cutting fluid for the electrode reshaping function of the novel apparatus being described. The level of the fluid is maintained above that at which the working surface (i.e., the upper surface in this instance) of the work piece 10 and the opposing machining discharge surface of the grinding electrode 18 are situated. In this case, the bottom of the container 14 comprises the work bed and is mounted on guide rollers or wheels 20, which run on tracks 22 extending in parallel longitudinal relationship with the container 14. A stationary drive motor 24 turns a longitudinally extending feed screw 26 which is engaged by a travelling nut 28. The motor 24 is a reversible type motor controlled by the motor control circuit means 30. The nut 28 is suitably coupled to the tank 14, as through the additional servomotor 34 carried by the travelling nut 28 so as to cause the tank to reciprocate along the tracks 22 in response to rotation of the motor in one direction or the other.

The function of the additional servo device 34 is to impart an additional degree of responsiveness or speed to the motivating system for the tank 14, added to the main or general motion produced by rotation of the feed screw 26. The servo 34 is schematically shown controlled by the servo control circuits 36 which in turn are controlled by the motor control circuits 30 in a manner effecting coordination as to direction of movement as well as to requirement for motion in order to meet the feed requirements of the grinding apparatus.

The disk-like peripherally shaped grinding electrode 18 is supported and rotated by the cantilever shaft 42 which projects transversely across the top of the tank 14 from the drive mechanism 40 mounted on an upright stationary support 38. This shaft locates the electrode 18 in the desired line of motion which will present it in the proper attitude to the work piece 10 when the work piece is advanced, with the tank, to the electrode.

Spark discharge machining energy is delivered from the primary source 44 to the discharge condenser 46 having terminals which are connected, respectively, to work piece 10 and grinding electrode 18. During discharge grinding operations, the function of the feed system is to present and progressively feed the work piece against the grinding electrode 18 in order to maintain a microscopic spark discharge gap between the working surfaces. In the event of a short-circuit condition, the resulting reduction of direct voltage delivered by the supply circuit 44 is utilized to produce a control signal applied through lead 60 to the motor control circuits, thence to the servo control circuits, to instantly retract the electrode sufficiently to clear the short-circuit condition.

In accordance with an important feature of the invention a dressing or reshaping device 62 is positioned in the line of reciprocation of the work piece 10 and includes cutting tool 64 adapted to bear against the peripheral machining edge of the electrode 18 as a means to redress the electrode without changing its position in the apparatus and without removing the work piece or the electrode from their respective supports. This reshaping device 62 is mounted firmly on the base of the tank 14 as is the work piece so that their relative positions remain undisturbed and so that their effective line of incidence upon the electrode surface remains constant. In this manner, by reciprocating the tank 14 in a definite, fixed line of motion so that the electrode 18 is presented alternately to the work piece and to the redressing tool 64, the required electrode shape is continuously maintained in order to impart the required form to the work piece. The function of device 62 is to present the dressing tool in dressing relationship to the electrode 18 with each cycle of reciprocation of the work piece support 12, 14. This, of course, necessitates provisions (not shown) of suitable nature for effecting progressive relative adjustment of one or the other transverse to the line of such reciprocation so as to allow for progressive errosive wear of the machining electrode as the process continues.

In order to control or program reciprocation of the tank 14 as described, programming apparatus may be provided of any suitable type using known techniques. This may simply represent limit switches (not shown) for causing alternate reversals of motor 24 at opposite limits of travel of the tank 14. Switch mechanism 70 causes motor operation to be reversed at the desired limits of travel of the tank assembly, and the motor's operating speed may be changed (if desired) to suit the function being performed at particular positions of the tank assembly between those travel limits. Preferably the motor operates rapidly when the electrode 18 is being moved between the dressing tool 64 and work piece 10, moves relatively slowly when it is being presented to the tool 64, and is converted to a servo mode (viz., controlled feed which maintains the spark gap distance) while it is being presented to the work piece. Furthermore, it is preferred that through appropriate timing or synchronizing means of any suitable or known type the electrode is permitted to remain in discharge machining relationship with the work piece only for a limited time, such as one revolution of the electrode, before being presented to the tool 64 for redressing.

In order to simplify and minimize the bulk and weight of the supports for the electrode 18 and particularly so for the cutting tool 64, the present invention provides a means by which the reaction forces produced by friction of the tool against the electrode are minimized. This is accomplished by the technique of vibrating the tool 64 generally in a sense circumferentially of the electrode 18 and at a relatively high rate of vibration (ultrasonic). As shown best in FIGURE 4, this vibrating system comprises a ferromagnetic base 100 from which in parallel relationship project two magnetostrictive field core pieces 102 and 104, each wound with one section of the coil 106. A separate feed mechanism 108 is adapted to advance the base and thereby the tool toward or from the electrode 18 in order to compensate for progressive reduction of electrode diameter as the electrode wears. A ferromagnetic bridging piece 64' carrying tool 64 interconnects the projecting ends of core pieces 102 and 104 and is suitably fastened thereon for removal and replacement when desired. Preferably, one of the pole pieces, such as 102, is of a negative magnetostrictive type (an alloy of 30% iron and 70% cobalt is an example), whereas the other is of a positive magnetostrictive type (e.g. nickel, etc.). As a result, application of alternating current to the coil 106 produces twice the tool vibration amplitude of a tool wherein a single type of magnetostriction is present.

Connected across the terminals of coil 106 is an energy storage condenser 112 in series with a dual polarity ignitron 114 having a starter electrode 116 which is connected serially with the secondary 118 of a trigger transformer and the mercury receptacle within the ignitron tube. Such tubes are capable of conduction in either direction once triggered and remain conductive during application of relatively high-frequency voltage above predetermined amplitude. The primary winding 120 which is associated with the secondary 118 is connected serially with the gaseous discharge diode 122 and the energy storage condenser 124. The latter in turn is serially connected with the charging resistor 126 across the input terminals 128 of a direct-voltage source 130. The condenser 112 is likewise connected across the source terminals through a charging resistor 132.

Figure 5:
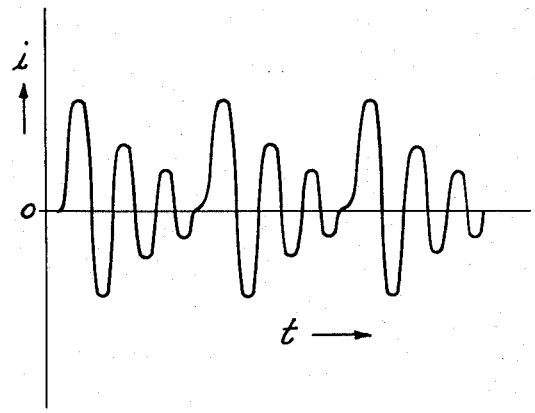
FIGURE 5 is a wave diagram illustrating the oscillatory energy wave form delivered by the oscillator in FIGURE 4.

Assuming the ignitron tube 114 is initially nonconductive and that tube 122 is also nonconductive, charges will develop on both of the condensers 112 and 124. When the condenser 124 reaches a certain charge potential, sufficient to fire the tube 122, an impulse of voltage is applied to the starter electrode 116 of the ignitron and a discharge path is thereby formed for the condenser 112 through the winding 116. The condenser 112 discharges its energy through this series circuit and is designed to be resonant with the inductance of coil 106 at a frequency (e.g. ultrasonic) which will vibrate the cutting tool 64 in a manner reducing friction. FIGURE 5 illustrates the successive bursts of vibrations triggered in this manner by the intermittent firing and deionizing of the trigger tube 112. By proper choice of the circuit values for the resistances 126 and 132 relative to the capacitances of the condensers 124 and 112, respectively, a substantially continuous chain of damped oscillations at the desired frequency may be produced by this system. Inasmuch as the current capacity of the ignitron 114 is great and no hard vacuum tubes are required to carry the load current, the amount of energy which may be delivered to the magnetostriction transducer which vibrates the tool 64 is high and the efficiency at which it is delivered is correspondingly high.

By vibrating the cutting tool 64 at these high frequencies and at high rates of lineal displacement of the tool in relation to the peripheral velocity of the electrode 18, the tool is alternately advanced and retracted in relation to the cutting point of contact and in the process of retraction the freshly cut metal of the electrode is exposed to the atmosphere and the resulting oxidation process greatly eases the cutting friction of the tool on the electrode, by reducing the welding tendency of the tool on the freshly cut metal which is considered to be the main contributor to high cutting friction. Friction is also reduced, as is tool temperature, by reason of the tool's immersion in the discharge fluid 16.

Because of this reduced friction, the supporting apparatus for the cutting electrode is not loaded heavily by reaction force and may be of comparatively light weight, simple construction. As a result of this reduction of weight, the amount of mass which must be moved by the servomotors 24 and 34 in order to feed the tank system in relation to the electrode 18 is correspondingly reduced and the precision and responsiveness of the servomechanism is correspondingly improved.

It is thus made feasible to incorporate directly in the discharge grinding apparatus itself a practical and efficient means for keeping the electrode in proper form to produce precision grinding, despite electrode erosion by spark discharge machining, and to accomplish this result with minimum apparatus and without interfering with the efficiency or the effectiveness of the servomechanism which feeds the work in relation to the electrode.

These and othes aspects of the invention will be recognized by those skilled in the art based on the present disclosure.

I claim as my invention:

1. Spark-discharge grinding apparatus comprising, in combination with a spark-discharge grinding electrode, a workpiece support, feed means operable to effect relative lineal motion between said electrode and said workpiece support for presenting a spark-discharge surface of said electrode and said workpiece mutually in spark-discharge relationship, said feed means including a main motion device operable to effect said lineal motion reciprocatively throughout a predetermined range and a feed servo including supplemental motivating means connected in tandem with the main motion device to maintain an operable machining spark-gap clearance between the electrode and workpiece while in said mutual spark-discharge relationship, a tool for redressing the electrode to maintain a predetermined shape of its spark discharge surface, tool-mounting means fixed to said support for operatively positioning said tool in the path of said relative motion to be operatively engaged by the electrode at a location spaced from a workpiece on said support, and means for effecting said relative motion at intervals during a spark-discharge grinding of said workpiece, whereby the electrode is presented alternately to the workpiece and to said tool.

2. The apparatus defined in claim 1, wherein the workpiece support comprises a machining-fluid container having a spark-discharge machining liquid therein at a level which immerses both the tool and the workpiece therein.

3. The apparatus defined in claim 2, wherein said container is mounted for lineal reciprocation on straight guide means and the electrode is stationarily mounted; the main motion device comprises a driving element operable to reciprocate parallel to said guide means; and the feed servo interconnects said driving element and the container and is operable to effect relative motion therebetween parallel to said guide means.

4. Electric-discharge metal-machining apparatus comprising, in combination with a machining electrode, a workpiece support, container means for a machining fluid in which the electrode and a workpiece on said support are immersible, feed means operable to effect relative lineal motion between said electrodes and said workpiece support for presenting an electric-discharge-machining surface of said electrode and said workpiece mutually in electric-discharge-machining relationship, said feed means including a main motion device to effect said lineal motion reciprocatively throughout a predetermined range and a feed servo including supplemental motivating means connected in tandem with the main motion device to maintain an operable electric- discharge-machining gap clearance between the electrode and workpiece while in said mutual relationship, a tool for redressing the electrode to maintain a predetermined shape of its electric-discharge-machining surface, tool-mounting means fixed to said support for operatively positioning the tool in the path of said relative motion to be operatively engaged by the electrode at a location spaced from the workpiece, and means for effecting said motion at intervals during electric-discharge-machining of said workpiece, whereby the electrode is presented alternately to the workpiece and to the tool.

5. The apparatus defined in claim 4, wherein the container is mounted for lineal reciprocation on straight guide means and the electrode is stationarily mounted, the main motion device comprising a driving element operable to reciprocate parallel to said guide means, and the feed servo interconnects said driving element and the container and is operable to effect relative motion therebetween parallel to said guide means.

References Cited in the file of this patent

UNITED STATES PATENTS

| | | |
|---|---|---|
| 1,821,836 | Hull | Sept. 1, 1931 |
| 2,085,100 | Knowles et al. | June 29, 1937 |
| 2,317,166 | Abrams | Apr. 20, 1943 |
| 2,441,158 | Krasnow | May 11, 1948 |
| 2,445,318 | Eldredge | July 20, 1948 |
| 2,459,153 | England | Jan. 18, 1949 |

FOREIGN PATENTS

| | | |
|---|---|---|
| 714,860 | Great Britain | Sept. 1, 1954 |